(12) United States Patent
Yacoub

(10) Patent No.: US 8,104,456 B2
(45) Date of Patent: Jan. 31, 2012

(54) METHOD AND ARRANGEMENT FOR EXHAUST-GAS RECIRCULATION IN AN INTERNAL COMBUSTION ENGINE

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/855,913

(22) Filed: Aug. 13, 2010

(65) Prior Publication Data

US 2011/0100341 A1 May 5, 2011

(30) Foreign Application Priority Data

Nov. 4, 2009 (DE) .......................... 10 2009 046 370

(51) Int. Cl.
*F02M 25/07* (2006.01)
*F02B 47/08* (2006.01)
*F02B 33/44* (2006.01)
*F01N 3/02* (2006.01)

(52) U.S. Cl. ......... 123/568.12; 60/278; 60/309; 60/311; 60/605.2; 123/25 A

(58) Field of Classification Search .............. 123/25 A, 123/25 C, 568.12, 299, 300, 305; 60/274, 60/278, 279, 309, 311, 320, 321, 605.2

See application file for complete search history.

(56) References Cited

U.S. PATENT DOCUMENTS

| 6,953,024 | B2 * | 10/2005 | Linna et al. .................... 123/435 |
| 7,036,482 | B2 * | 5/2006 | Beck et al. ..................... 123/305 |
| 8,015,809 | B2 * | 9/2011 | Watson ........................ 60/605.2 |
| 2008/0223038 | A1 | 9/2008 | Lutz et al. |
| 2009/0071150 | A1 * | 3/2009 | Joergl et al. .................. 60/605.2 |
| 2009/0205326 | A1 * | 8/2009 | Watson ........................... 60/309 |
| 2010/0242929 | A1 * | 9/2010 | Kardos et al. ............ 123/568.12 |
| 2011/0099988 | A1 * | 5/2011 | Pellico ............................ 60/309 |

FOREIGN PATENT DOCUMENTS

| DE | 102005023958 A1 | 11/2006 |
| WO | 2008115330 A1 | 9/2008 |

OTHER PUBLICATIONS

Deutsches Patent- und Markenamt (Examination report from corresponding DE patent application, dated Jul. 29, 2010, 3 pages indicating that a DE patent cannot be granted in light of references D1 and D2).

* cited by examiner

*Primary Examiner* — Willis Wolfe, Jr.
(74) *Attorney, Agent, or Firm* — Julia Voutyras; Brooks Kushman P.C.

(57) ABSTRACT

A system and method are disclosed for providing exhaust-gas recirculation in an internal combustion engine that has an exhaust-gas turbocharger. The exhaust gas to be recirculated is collected from the exhaust line downstream of a turbine of the turbocharger, passed through a condensate separator, and supplied into the intake line upstream of the compressor. The condensate is filtered, collected in a reservoir, and pumped to an injection device coupled to the engine intake at a location downstream of the compressor.

16 Claims, 1 Drawing Sheet

METHOD AND ARRANGEMENT FOR EXHAUST-GAS RECIRCULATION IN AN INTERNAL COMBUSTION ENGINE

CROSS-REFERENCE TO RELATED APPLICATIONS

This application claims foreign priority benefits under 35 U.S.C. §119(a)-(d) to DE 10 2009 046 370.4 filed Nov. 4, 2009, which is hereby incorporated by reference in its entirety.

BACKGROUND

1. Technical Field

The disclosure relates to a method and an arrangement for exhaust gas recirculation (EGR) in an internal combustion engine.

2. Background Art

Methods and arrangements for exhaust gas recirculation have long been used in internal combustion engines to improve efficiency and reduce emissions. In diesel engines in particular, the recirculation of exhaust gas is known for reducing particulate matter and nitrogen oxide emissions.

In an internal combustion engine having a turbocharger, it is possible for exhaust gas to be extracted upstream of the turbine of the turbocharger and to be supplied to the charge air of the engine downstream of the compressor of the turbocharger, in particular downstream of the charge air cooler which is generally connected downstream of said compressor. With this type of EGR, the exhaust-gas circuit is situated in the high-pressure and high-temperature region of the engine, such that usually no exhaust-gas condensate is generated therein. Such high-pressure EGR however has some disadvantages, for example relatively high particulate emissions in the case of diesel engines.

Alternatively, it is known for exhaust gas to be extracted downstream of the turbine of the turbocharger and to be supplied to the inducted charge air upstream of the compressor of the turbocharger. With such low-pressure exhaust-gas recirculation, however, condensate forms on account of the cooling of the recirculated exhaust gas. The condensate contains primarily water with a small concentration of aggressive compounds such as nitric acid, sulfuric acid, and/or sulfurous acid. Furthermore, the condensate contains solid matter in the form of particulates which originate primarily from particulate matter formed in the engine. If the exhaust gas to be recirculated is branched off downstream of an EGR system, which may include inter alia a particulate filter, then the particulate matter in the condensate is reduced. Nevertheless, even in this case, the condensate also contains residual particles and particulate matter from the exhaust system which may for example have become detached, as a result of wear or as a result of chemical or mechanical influences, from the particulate filter or from other components of the EGR system. Herein, the particulate matter is encompassed within the expression "condensate", even though they at least partially have a different origin and/or a different composition than the liquid or solid exhaust-gas constituents which are generated as a result of condensation or directly in the combustion chamber.

If the condensate, which is entrained in droplet or particle form, in the exhaust gas now passes into the compressor as a result of being added to the charge air taking place upstream of the compressor, the droplets and the particles can damage the compressor blades on account of the very high speeds of the compressor blades.

It is therefore proposed in DE 10 2005 023 958 A1 that the recirculated exhaust gas be conducted through a condensate separator and that the corrosive component of the exhaust gas thereby be removed from the exhaust-gas flow. For the removal of the condensate, a thermal process is provided, as a result of which the acids contained in the condensate are converted into non-harmful gases and water which are added to the main flow of the exhaust gas downstream of the branch of the exhaust gas to be recirculated and which are discharged to the atmosphere via the exhaust tailpipe. The thermal condensate removal takes place in a multi-stage device in which a heating element, at a temperature of up to 450° C., evaporates and/or reacts aggressive substances. This process and apparatus are associated with a comparatively high level of technical expenditure. In the event of insufficient heating, it is not possible to prevent the discharge of harmful acids to the environment.

SUMMARY

According to an embodiment of the disclosure, an EGR system coupled to an internal combustion engine having turbocharger includes: an EGR line coupled to an exhaust line of the engine at a location downstream of the turbocharger, a condensate separator disposed in the EGR line, a liquid line coupled to the condensate separator, and an injection device coupled to the liquid line and disposed in an intake line of the engine. The turbocharger includes a turbine disposed in the exhaust line of the engine and a compressor disposed in the intake line of the engine. The EGR line is coupled to the exhaust line at a first end of the EGR line and is coupled to the intake line at a second end of the EGR line. The second end of the EGR line is coupled to the intake line at a location upstream of the compressor. The injection device is disposed in the intake line at a location downstream of the compressor. In some embodiments, the liquid line may further include one of a filter, a reservoir, and a pump. The injection device may inject liquid as a function of operating parameters, with one of those parameters possibly being NOx content of the exhaust gas.

A method is disclosed for recirculating exhaust gas in a turbocharged internal combustion engine. The method includes: collecting exhaust gas into an EGR duct coupled to an engine exhaust line downstream of the turbocharger, transporting the collected exhaust gas into a condensate separator out of which comes dried exhaust gas and a condensate, and injecting the condensate into an intake line of the engine. The condensate is injected into the intake line downstream of the compressor and the dried exhaust gas is introduced into the intake line upstream of the compressor. The condensate, in some embodiments, is transported through a filter prior to injecting the condensate into the intake line of the engine. A pump is used to pump the condensate from the condensate separator to an injection device used to inject the condensate into the engine intake line.

By providing a condensate separator, the exhaust gas is substantially free from condensate droplets; therefore, the risk of damage to the compressor blades is greatly reduced. Since particulates contained in the exhaust gas may serve as condensation nuclei for the condensate droplets, particulates are often contained in the condensate droplets and are thus separated in the condensate separator. Depending on the mode of operation of the condensate separators, even particulate matter are not associated with condensate droplets may be separated.

By providing condensate to the intake line of the engine, the NOx formation of the engine is reduced. Because the condensate is provided downstream of the compressor, damage by condensate is largely obviated. Furthermore, in embodiments with filters in the condensate line, the particulate matter is removed, and thus not supplied into the engine. A further advantage of removing the particulate matter from the condensate is in preventing buildup of particulate matter in the condensate line and/or preventing damage to the pump.

According to some embodiments, the liquid condensate is collected in a reservoir and injected as a function of operating parameters. Such operating parameters may for example relate to the engine, in particular the load and temperature conditions, but also to the exhaust-gas quality and composition. The liquid condensate may be injected when it can be utilized during the combustion.

In some embodiments, the injection quantity is controlled as a function of the dew point of the air/exhaust-gas mixture supplied to the engine. It is possible in this way in particular to prevent excessive condensate quantities from being present in the air which is supplied to the engine.

According to an embodiment of the disclosure, the injection of the liquid condensate is regulated as a function of the exhaust-gas composition, in particular as a function of the nitrogen oxide content ($NO_x$). For this purpose, it is possible for a sensor to be provided for measuring the present nitrogen oxide content in the exhaust gas, and also a controller for regulating the condensate injection. In this way, it is possible in a simple manner to obtain a particularly effective reduction of the $NO_x$ emissions.

According to one embodiment of the disclosure, the proportion of the recirculated exhaust gas and/or the mixing ratio between the inducted air and the exhaust gas supplied downstream of the compressor is adjustable. For this purpose, controllable valves may be provided at the corresponding branches.

One or more exhaust-gas aftertreatment devices may be provided within the exhaust system, with some upstream and some downstream of the EGR line. The exhaust-gas aftertreatment devices may be one or more of: oxidation catalytic converters and/or particle filters and/or nitrogen oxide filters and/or SCR ("selective catalytic reduction") catalytic converters. In one embodiment, a particulate filter is provided upstream of the EGR duct to prevent particulate matter from entering the EGR duct

BRIEF DESCRIPTION OF THE DRAWING

The disclosure will be explained in more detail below by way of example on the basis of a drawing, in which.

DETAILED DESCRIPTION

Figure 1:
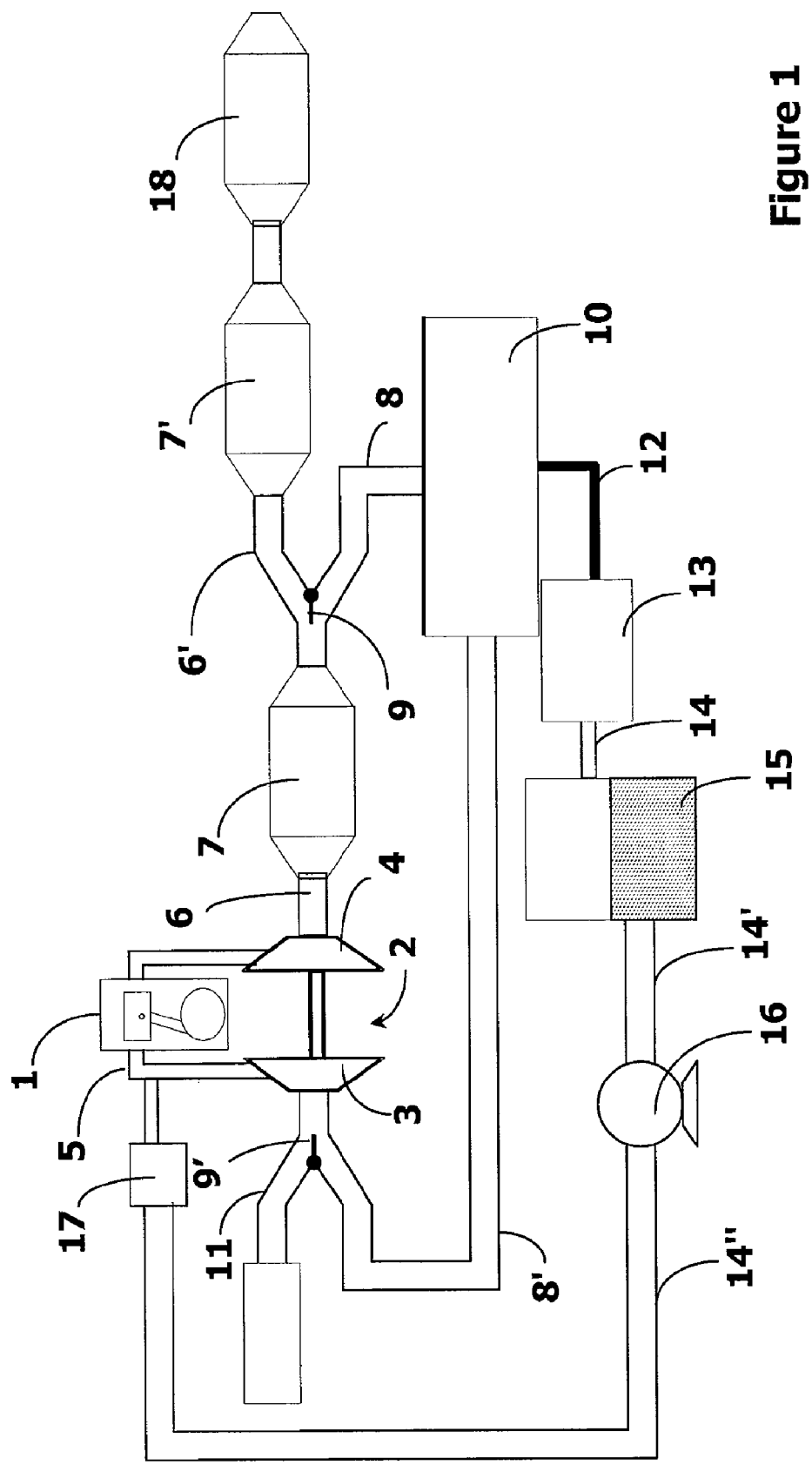
FIG. 1 shows a schematic illustration of an arrangement according to an embodiment of the disclosure for EGR in an internal combustion engine having a turbocharger.

As those of ordinary skill in the art will understand, various features of the embodiments illustrated and described with reference to any one of the FIGURES may be combined with features illustrated in one or more other FIGURES to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

According to FIG. 1, an internal combustion engine 1, in particular a diesel engine, is provided with an exhaust-gas turbocharger 2 which has a compressor 3 and a turbine 4. The turbine 4 is traversed by the exhaust-gas flow of the internal combustion engine 1 and thereby driven. The turbine 4 drives the compressor 3, which supplies compressed charge air to the internal combustion engine 1 via an intake line 5. From the turbine 4 of the turbocharger 2, the exhaust gas passes through an exhaust line 6 into a first exhaust-gas aftertreatment device 7 which may, for example, be one or more of an oxidation catalytic converter, a particulate filter, a nitrogen oxide filter, and/or an SCR catalytic converter. Downstream of the first exhaust-gas aftertreatment system 7, an EGR line 8 branches off from the exhaust line 6', through which EGR line 8 a predetermined proportion of the exhaust gas, or a proportion which can be adjusted by a valve 9, passes to a condensate separator 10, which may be designed as a dryer. The exhaust gas which has been cleaned of condensate or dried is conducted via an EGR line 8' to the air intake line 11, where the recirculated exhaust gas is mixed with the intake air and is supplied at the upstream side to the compressor 3 of the turbocharger 2. A valve 9' may be arranged at the opening-out point of EGR line 8' into the air intake line 11 to adjust the mixing ratio of inducted air and recirculated exhaust gas.

The condensate, which has been separated by the condensate separator 10 from the EGR, has a liquid phase and a solid phase, specifically particles or particulate matter. The mixture of the liquid and solid phases passes via a condensate line 12 to a filter 13, which removes the solid phase from the mixture. The remaining liquid phase is supplied via a liquid line 14 to a reservoir 15. The liquid condensate can be conveyed out of reservoir 15 via lines 14', 14" by a pump 16, and supplied via an injection device 17, for example an injection nozzle, to the charge air of the internal combustion engine 1 in the intake line 5. For metering injection of condensate, it is possible for a sensor arrangement (not illustrated) to be arranged in the intake line 5, which sensor device permits a determination of the dew point, such that the pump 16 and injection device 17 and/or valves 9, 9' can be actuated in an optimum fashion by a control device (not illustrated).

In some embodiments, an additional exhaust-gas aftertreatment device 7' is provided. The exhaust-gas aftertreatment device may be one or more of an oxidation catalytic converter, a particulate filter, a nitrogen oxide filter and/or an SCR catalytic converter. The residual, treated exhaust gases are discharged through a muffler 18 to atmosphere.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:
1. An EGR system coupled to an engine having a turbocharger, comprising:
an EGR line coupled to an exhaust line of the engine downstream of the turbocharger;
a condensate separator disposed in the EGR line;

a liquid line coupled to the condensate separator and having a filter; and an injection device coupled to the liquid line and disposed in an intake line of the engine to selectively inject condensate into the intake.

2. An EGR system coupled to an engine having a turbocharger, comprising:

an EGR line coupled to an exhaust line of the engine downstream of the turbocharger;

a valve disposed in the EGR line to control flow of EGR through the EGR line;

a condensate separator disposed in the EGR line; and an injection device coupled to the condensate separator and disposed in an intake line of the engine to selectively inject condensate into the intake.

3. An EGR system coupled to an engine having a turbocharger, comprising:

an EGR line coupled to an exhaust line of the engine at a location downstream of the turbocharger;

a condensate separator disposed in the EGR line; and an injection device coupled to the condensate separator and disposed in an intake line of the engine to selectively inject condensate into the intake with the quantity of condensate based on NOx content of engine exhaust gas.

4. The EGR system of claim 1 wherein:

the turbocharger comprises a turbine disposed in the exhaust line of the engine and a compressor disposed in the intake line of the engine;

the EGR line is coupled to the exhaust line at a first end of the EGR line and is coupled to the intake line at a second end of the EGR line;

the second end of the EGR line is coupled to the intake line at a location upstream of the compressor; and the injection device is disposed in the intake line at a location downstream of the compressor.

5. The EGR system of claim 1 wherein the liquid line further comprises a reservoir.

6. The EGR system of claim 1 further comprising a condensate pump coupled to the injection device.

7. The EGR system of claim 1 wherein the injection device injects liquid as a function of operating parameters.

8. The EGR system of claim 1 wherein the exhaust line comprises at least one aftertreatment device upstream of where the EGR duct couples to the exhaust line.

9. A method for recirculating exhaust gas in an internal combustion engine having a turbocharger, the method comprising:

collecting exhaust gas into an EGR duct coupled to an engine exhaust line downstream of the turbocharger;

transporting the collected exhaust gas into a condensate separator transporting the condensate through a filter; and injecting the condensate into an intake line of the engine.

10. The method of claim 9 wherein the turbocharger comprises a turbine disposed in the engine exhaust line and a compressor disposed in an engine intake line and the condensate is injected into the intake line downstream of the compressor, the method further comprising:

introducing exhaust gas downstream from the condensate separator into the intake line upstream of the compressor.

11. The method of claim 9, further comprising:

pumping the condensate from the condensate separator to an injection device used to inject the condensate into the engine intake line.

12. An EGR system for an internal combustion engine that has a turbocharger with a compressor and a turbine, comprising:

an EGR line coupling an exhaust line of the engine with an intake line of the engine;

a condensate separator arranged in the EGR line; and a condensate line including a filter and a reservoir coupled between the condensate separator and an injection device coupled to the intake line of the engine.

13. The EGR system of claim 12 wherein the injection device is coupled to the intake line downstream of the compressor.

14. The EGR system of claim 12 wherein the EGR line is coupled to the exhaust line downstream of the turbine and is coupled to the intake line upstream of the compressor.

15. The EGR system of claim 12 wherein the condensate line further includes a pump.

16. The EGR system of claim 12 wherein the injection device supplies condensate into the intake line of the engine based on an engine operating condition.

* * * * *